March 13, 1962    D. D. HARMON    3,024,693
APPARATUS FOR SPECTROGRAPHIC ANALYSIS
Filed March 16, 1959    2 Sheets-Sheet 1
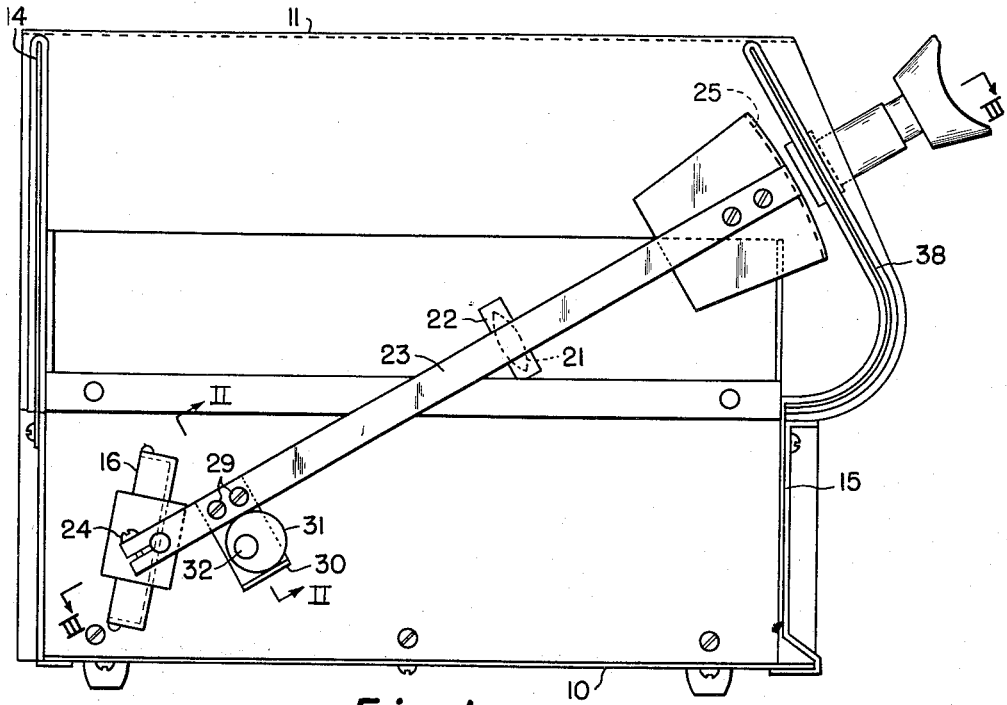
Fig. 1
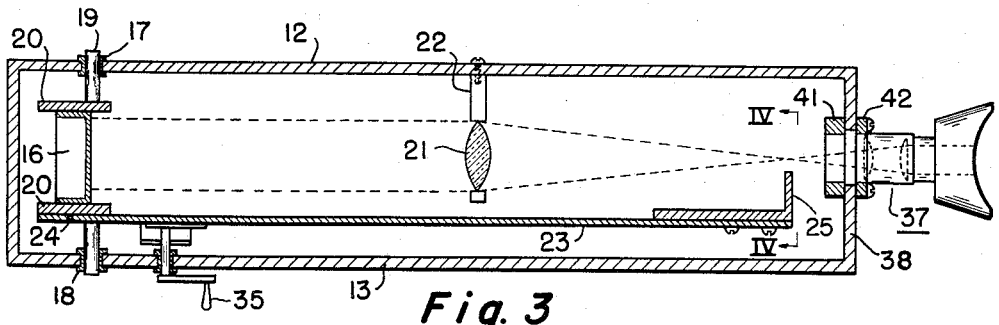
Fig. 3
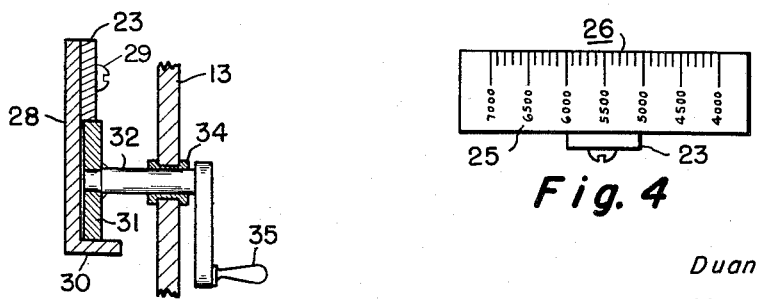
Fig. 2
Fig. 4
INVENTOR.
Duane D. Harmon
BY Webb, Mackey & Burden
HIS ATTORNEYS

United States Patent Office

3,024,693
Patented Mar. 13, 1962

3,024,693
APPARATUS FOR SPECTROGRAPHIC ANALYSIS
Duane D. Harmon, Sewickley, Pa., assignor to Fisher Scientific Company, Pittsburgh, Pa., a corporation of Pennsylvania
Filed Mar. 16, 1959, Ser. No. 799,679
20 Claims. (Cl. 88—14)

A spectroscope is an instrument for analyzing complex radiation by prismatic dispersion or by diffraction. To secure as complete a separation of the wave lengths as possible, a narrow slit is used as a source so that the color images of the slit will overlap as little as possible. In a visual diffraction grating spectroscope employing a plane grating, parallel beams of light impinge upon the grating and are diffracted through an objective lens or to a spherical or parabolic mirror which focuses the individual wave lengths on a focal curve which can be observed through an eyepiece. The diffraction grating is rotatable and as it is rotated, the various wave lengths which constitute the beam striking the grating are focused on the focal curve of the objective lens. I have found it desirable to include a numerical scale calibrated in wave lengths coincident with the focal curve such that the spectrum and the scale can be observed simultaneously through the eyepiece. It is essential that the scale and spectrum move in synchronism across the focal curve and field of view of the eyepiece as the spectrum is scanned in order to provide accurate wave length measurements at any point in the field of view. The present invention provides a means by which the scale and spectrum are moved in synchronism across the focal curve such that the respective numerical values on the scale are immediately adjacent the corresponding spectral lines. It was essential in developing my apparatus that a minimum number of moving parts be involved to maintain the cost of the apparatus and maintenance problems low, and accuracy of the instrument high. I have found that there is a correlation between the focal length of the objective lens and the angle through which the grating is rotated which determines the distance that the spectral lines move along the focal curve upon rotation of the grating. I have used this correlation in developing a simple, inexpensive, accurate spectroscope.

I have also developed a simple apparatus for correlating the movement of a scale and spectral lines in the focal curve of the objective lens.

I have described a present preferred embodiment of my invention in the following drawings:

FIGURE 1 is a side elevation view of my spectroscope with parts removed for clarity;

FIGURE 2 is a cross section taken on line II—II of FIGURE 1;

FIGURE 3 is a cross section taken on line III—III of FIGURE 1;

FIGURE 4 is a view taken on line IV—IV of FIGURE 3;

Figure 5:
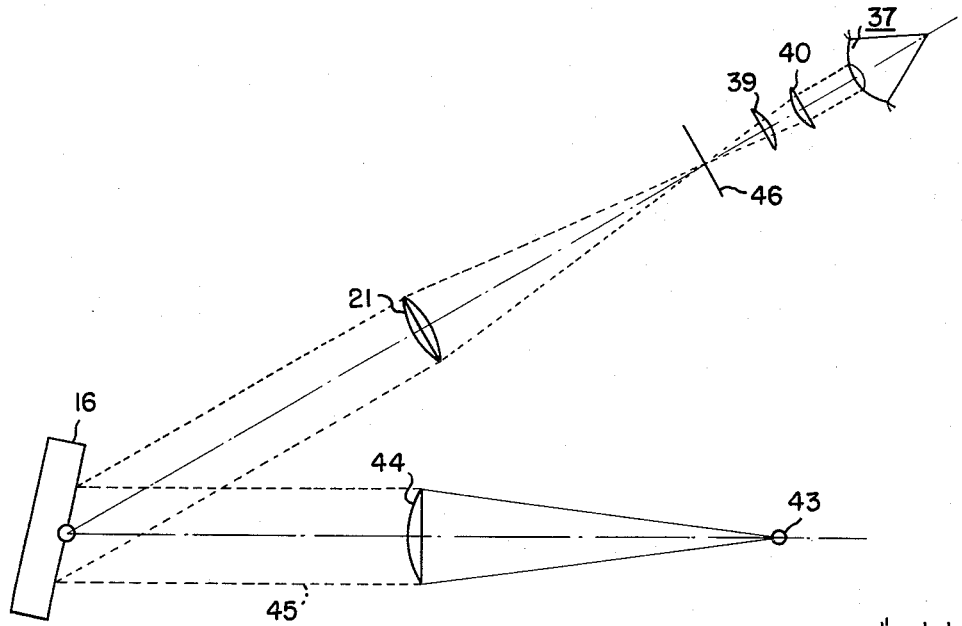
FIGURE 5 is a diagrammatic side view of the spectroscope showing a light beam path.

Briefly, the present invention consists of a spectroscope having a plane diffraction grating, rotatably mounted about an axis, from which beams of light are diffracted through an objective lens which focus the spectrum on a focal curve of the lens observable through an eyepiece. An arm is rigidly affixed to the diffraction grating, at the axis thereof, and extends upwardly past the objective lens and near the area of the focal curve. A scale, calibrated in angstrom units, is affixed to the upper end of the arm and is observable through the eyepiece simultaneously with the observation of the spectrum. Thus, as the spectrum is scanned by rotating the diffraction grating, which simultaneously rotates the arm and the scale, a synchronous movement of the scale and the spectrum is achieved across the focal curve.

More specifically, referring to FIGURES 1, 2 and 3, a metal box-like structure, having a bottom plate 10, a top hood 11, side walls 12 and 13, and end walls 14 and 15, forms an enclosure for the spectroscope. This enclosure is of sufficient size to accommodate the spectroscope structure to be described hereinafter.

A plane diffraction grating 16 having 1226 lines/mm. is rigidly affixed to axis pins 19 which are pivotally mounted in the side walls 12 and 13 by bearings 17 and 18 respectively, as shown in FIGURE 3. The axis pins 19 are rigidly affixed to the diffraction grating by vertical plates 20. The plates 20 are affixed to the diffraction grating in any known manner such as by screws.

An objective lens 21 is rigidly affixed to the side wall 12 by screws passing through the side wall and into a lens mounting fixture 22 which rigidly holds lens 21. Fixture 22 is of conventional construction and maintains the lens 21 within the path of the diffracted beam, as will be explained hereinafter.

An arm 23 is rigidly affixed to pin 19 on one side of the grating by a clamp screw 24 in the end thereof. The screw 24 may be tightened, thereby closing a slit in the lower end of arm 23 and rigidly clamping the arm to pin 19. The arm 23 and the diffraction grating 16 move in synchronism; that is, when the diffraction grating is rotated through a predetermined angle, the arm 23 rotates through an identical angle. A scale 25, calibrated in angstrom units 26, is affixed to the upper end of the arm 23 by screws. The scale 25 lies within the focal curve of lens 21 (designated 46 in FIGURES 5 and 6) and is observable through an eyepiece to be described hereinafter.

Near the lower end of arm 23, a vertical, downwardly extending plate 28 is affixed to the arm by screws 29. The lower end of the plate 28 is bent in an L-shape 30. An eccentrically mounted cam 31 is rigidly affixed to a shaft 32 which is mounted in a bearing 34 in side wall 13. A portion of the shaft 32 extends outside the wall 13 and has a crank handle or knob 35. The cam 31 is located precisely between the lower side of arm 23 and the upper face of shape 30 as shown in FIGURE 2. Thus, upon rotation of the shaft 32, the cam 31 is rotated and pivots the arm 23 upward or downward about the pins 19. The diffraction grating 16 is simultaneously pivoted with the arm 23 and thus the spectrum can be scanned.

An eyepiece 37 is rigidly affixed to an upper portion of the end wall 15. This eyepiece is of conventional Ramsden construction and contains a pair of lenses 39 and 40. The lenses 39 and 40 are focused on the focal curve of the lens 21 and thereby permit observation of the spectrum and scale in the focal curve. The eyepiece 37 passes through the wall portion 38 of side wall 15 and is clamped rigidly in position by screw means 41 and 42 in well-known manner.

FIGURE 5 shows the path of the light beams in the spectroscope. The parallel light striking the diffraction grating 16 may be derived from any source. For the present purposes, FIGURE 5 shows the light, derived from a source 43, passing through a collimating lens 44, thereby being directed in a parallel path 45 to impinge against the plane diffraction grating 16 and be diffracted through the objective lens 21 and focused on the focal curve 46. The focal curve is viewed through the eyepiece 37. Other lens arrangements and other sources may be used other than those shown in FIGURE 5 without departing from the basic concepts of my invention.

Figure 6:
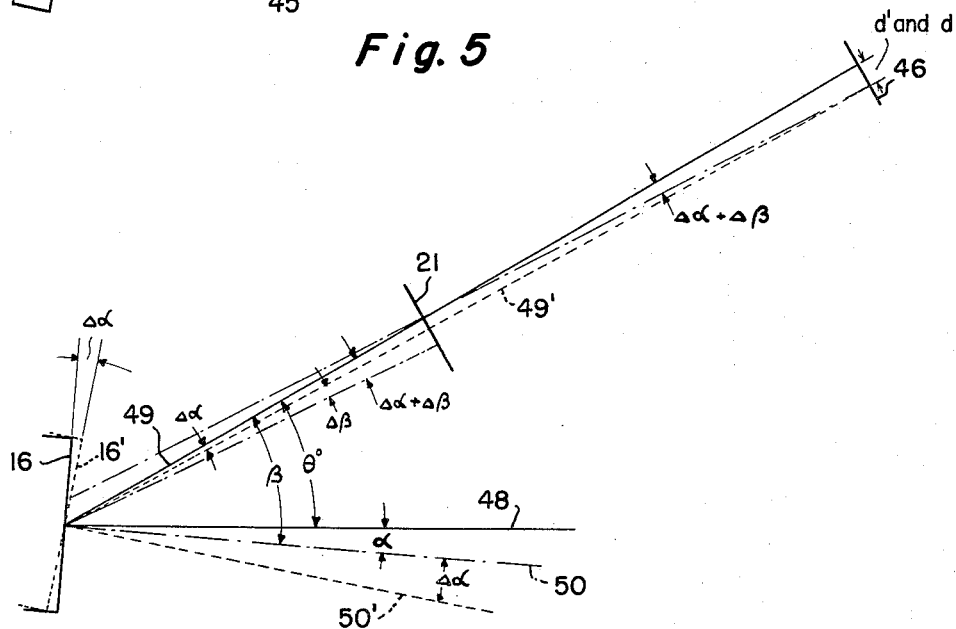
FIGURE 6 is a diagrammatic side view of the spectroscope showing light beam paths before and after rotation of the diffraction grating.

The problem which my invention solves is to make a point on the scale 25 move across the field of view of the eyepiece at the same rate as does a spectral line (indicated on the scale by said point) upon rotation of the diffraction grating 16, thereby permitting accurate wavelength readings to be made at any location in the field at view. Referring to FIGURE 6, a central ray 48 of an incident beam of light impinges upon the diffraction grating 16 and is diffracted along the central axis 49 of the lens 21 and the eyepiece 37. A normal 50 to the grating is the reference point from which the angle of incidence $\alpha$ and the angle of diffraction $\beta$ are measured. The angle $\alpha$ is included between ray 48 and the normal 50, and angle $\beta$ is included between ray 49 and the normal 50. Simple calculations from the grating formula $$n\lambda = a(\sin \alpha + \sin \beta)$$

clearly show that for every change in the angle of incidence, i.e., $\Delta\alpha$, a corresponding change in the angle of diffraction, i.e., $\Delta\beta$, exists for a given spectral line. Thus as the grating 16 rotates about the pins 19 through an angle $\Delta\alpha$, to a new position 16′, the normal to the grating 50 rotates a like amount to a new position 50′, and the arm 23, attached to the grating, also rotates through an angle $\Delta\alpha$ from a position corresponding to ray 49 to a position 49′. A point on the scale 25 at the upper end of arm 23 will move from the center toward one edge of the field of view of the eyepiece when the grating and arm are rotated through an angle $\Delta\alpha$. Thus, assuming that the length of the arm from the center of the pins 19 to the furthest point on the scale 25 is arm length L, the distance a point on the scale will move in the focal curve as the grating rotates through an angle $\Delta\alpha$ (measured in radians) is $d$. Thus $d = L\Delta\alpha$. Stated another way, the distance $d$ is the distance which any point on the scale (attached to an arm having length L) will move in the focal curve upon rotation of the grating through an angle $\Delta\alpha$.

At the same time, the rotation of the grating through an angle $\Delta\alpha$ causes a change $\Delta\beta$ (also measured in radians) in the angle of diffraction for a given wave length. Since $\beta + \Delta\beta$ is measured from the grating normal, (which now has been rotated through an angle $\Delta\alpha$), the total change in direction of a given wave length equals the sum of the absolute values of $\Delta\alpha + \Delta\beta$.

When the objective lens 21 of the spectroscope is illuminated with a beam of parallel monochromatic light of a given wave length, it will focus this beam on the focal curve 46. Therefore, the beam of diffracted light, which has been rotated through an angle $\Delta\alpha + \Delta\beta$ (by rotation of the grating through an angle $\Delta\alpha$), will come to focus at a point on the focal curve which forms an angle $(\Delta\alpha + \Delta\beta)$ at the optical center of the objective lens with the focal point of the same beam before the gating was rotated through an angle $\Delta\alpha$. Therefore, the distance $d'$ between these two focal points equals the focal length $f$, of the lens 21 times $\Delta\alpha + \Delta\beta$. Therefore, $$d' = f(\Delta\alpha + \Delta\beta)$$

Both angles $\Delta\alpha$ and $\Delta\beta$ are expressed in radians in this equation.

For a spectral line of a given wave length to move in synchronism with a point on a scale as both move from the center of the field of view to the edge of the field of view, $d$ must equal $d'$, and $L\Delta\alpha$ must equal $f(\Delta\alpha + \Delta\beta)$. Consequently:

$$L = f\frac{(\Delta\alpha + \Delta\beta)}{\Delta\alpha}$$

with all angles measured in radians.

Thus I have found the relationship between the length L of the arm 23 from the pivot point 19 to the focal curve 46 as a function of the focal length of the objective lens 21.

The angle $\theta$ between the central incident beam 48 and the central axis 49 of the lens 21 is maintained constant irrespective of the rotation of the grating. I have found that if this angle $\theta$ is maintained very close to zero, mechanical difficulties arise in the spectroscope due to undesirable reflections from the surface of the collimating lens and the objective lens as well as other mechanical difficulties involving arrangement of the apparatus. For my invention, I have found that the angle $\theta$ between the beam 48 and the axis 49 should be maintained at about 30° for convenience and accuracy when using a grating having 1,226 lines/mm. Calculating from the above formula while maintaining $\Delta\alpha$ at a maximum value of 0.1745 radian, I have found that L varies from consistency by a small amount. L has a value of $2.17f$ at 4,000 A. units, and $2.33f$ at 7,000 A. units. Choosing a value $L = 2.22f$, and substituting it into the formula, then at 5,000 A. units, $d - d'$ equals zero, and at 4,000 A. units, and at 6,000 A. units, $d - d'$ equals plus or minus $.001f$. At 7,000 A. units, $d - d'$ equals $.0019f$. These deviations are acceptable in an instrument of small dispersion in which the red end of the spectrum is of small importance.

When the angle $\theta$ between the central beam 48 and the central axis 49 equal 45° (using a grating having 1,226 lines/mm.) and using a maximum value of $\Delta\alpha$ equal to .01745 radian, I have calculated that L varies from consistency by a greater amount than when $\theta = 30°$. L equals $2.20f$ at 4,000 A. units, and $2.65f$ at 7,000 A. units. Choosing a value $L = 2.34$, I have found that the following values of $d - d'$ result:

At 5,000 A. units, $d - d' = 0$
At 4,000 and 6,000 A. units, $d - d' = \pm.0026f$
At 7,000 A. units, $d - d' = -.0052f$ These deviations would be acceptable in an instrument having very smal values of $f$, but in the usual apparatus would be unacceptable. Thus I have concluded the maximum angle $\theta$ which can exist between the central beam 48 and the central axis 49 is 45°, and I prefer to have angle $\theta$ limited to about 30°.

All the above calculations have been made with a diffraction grating of 1,226 lines per millimeter and the values of L, $d - d'$, and $\theta$ shown apply only to this situation. Gratings having different spacings would change the values expressed above but would not change the basic concepts involved here.

This I have found that for an angle $\theta$ of 30° between the central beam 48 and the central axis 49, the length L of the arm 23 from the pivot point 19 to the focal curve 46 must be maintained at 2.22 times the focal length of the objective lens 21. Likewise when the angle between the central beam 48 and the central axis 49 is 45°, the length L of the arm 23 from the pivot point 19 to the focal plane 46 must be 2.35 times the focal length of the objective lens 21.

For any spectroscope, the formula $$L = f\frac{(\Delta\alpha + \Delta\beta)}{\Delta\alpha}$$

can be utilized to determine the ratio between the length of the arm 23 and the focal length of the objective lens 21. The value of $\Delta\alpha$ and $\Delta\beta$ are the absolute values without regard to the sign of the angle and are measured in radians.

*Example*

In using a spectroscope having a plane reflection diffraction grating having 1,226 lines/mm. and an angle $\theta$ of 30° between the central beam 48 and the central axis 49, I have used an arm length of 270.8 millimeters from the pivot point 19 to the focal plane 46 with a 25 mm. diameter objective lens 21 having a focal length of 122 millimeters. I observed through the eyepiece 37 that there was synchronous movement between the spectrum and the scale and the scale was accurately aligned numerically with the wave lengths which it indicated in the spectrum.

All of the above calculations and conclusions are based on the use of a diffraction grating having 1,226 lines per millimeter. I have found, however, that as the number of lines per millimeter decreases on the grating, the deviation of $L/f$ from consistency also decreases. For example, when a grating having 613 lines per millimeter is used in my spectroscope:

|  | $\theta=30°$ | $\theta=45°$ |
| --- | --- | --- |
| at 4,000 A | $L=2.09f$ | $L=2.09f$ |
| at 7,000 A | $L=2.17f$ | $L=2.19f$ |

Thus, when using a grating having 613 lines per millimeter, and with $\theta$ equal to 30°, an average value of $L/f$ can be chosen: 2.13. Therefore the arm length L must equal 2.13 times the focal length $f$ of the objective lens 21. Likewise, when $\theta$ equals 45° in the same spectroscope, an average value of $L/f$ can be chosen: 2.14 and the arm length L must equal 2.14 times the focal length $f$ of the objective lens 21. Thus an angle $\theta$ equal to 45° is acceptable in the spectroscope with a diffraction grating having 613 lines/mm. is used.

The above apparatus descriptions relate to my preferred embodiment wherein an arm 23 carrying the scale is directly connected to the axis of rotation of the grating; however, I have also found that many other mechanical systems will function properly to move the scale the required distance in the focal curve. As stated above, the spectrum moves a distance $d=f(\Delta\alpha+\Delta\beta)$. Thus the scale must also move this distance to be in synchronism with the spectrum movement. The movement of the grating through an angle $\Delta\alpha$ is correlated with the distance through which the spectrum moves, therefore each time the grating moves through an angle $\Delta\alpha$, both the spectrum and scale must move a distance $f(\Delta\alpha+\Delta\beta)$ along the focal curve. The axis 19 of the grating also moves through an angle $\Delta\alpha$ and thus any gear or pinion rigidly affixed to it would also move through this angle. It is obvious that a simple gear train can connect a gear keyed to axis 19 with the scale and thus move the scale a distance $f(\Delta\alpha+\Delta\beta)$ for each movement of the axis 19 through an angle $\Delta\alpha$. The distance between the axis 19 and the focal curve 46 does not have any bearing on this relationship other than the fact that the distance must be sufficient to accommodate the gear train. An example of such a gear train is a large gear keyed to axis 19 and a smaller gear mounted on a second axis with an arm rigidly affixed to the second axis and transmitting in the proper direction the movement of its free end to a scale in the focal curve 46. The small gear and large gear are in engagement and of such size that upon rotation of the large gear through an angle $\Delta\alpha$, the small gear will rotate through an angle $2\Delta\alpha$. The arm affixed to the second axis will also rotate through an angle $2\Delta\alpha$, therefore, the length of the arm multiplied by $2\Delta\alpha$ (measured in radians) must equal $f(\Delta\alpha+\Delta\beta)$ (with both $\Delta\alpha$ and $\Delta\beta$ being expressed in radians). Thus $$NL\Delta\alpha=f(\Delta\alpha+\Delta\beta)$$

wherein:

N is the mechanical advantage gained in the gear train or any other mechanical linkage when initially actuated through an angle $\Delta\alpha$ by the axis of the grating;

L is the length of the lever arm which moves the scale; i.e. the lever arm which is moved through the angle $N\Delta\alpha$;

$f$ is the focal length of the objective lens;

$\Delta\alpha$ is the change in the angle of incidence (measured in radians) or the angle through which the grating is rotated; and $\Delta\beta$ is the corresponding change in the angle of diffraction caused by $\Delta\alpha$ (measured in radians).

My invention also functions properly with several types of prism spectroscopes, particularly those known as constant deviation prism spectroscopes. Since the dispersion of prisms vary with the material from which they are made, the relationship between the arm length and angles involved must be calculated for each particular material used; however, the basic relationship exists in the same fundamental way as discussed above with respect to diffraction gratings.

While I have described a present preferred embodiment of my invention, it may be otherwise embodied within the scope of the following claims.

I claim:

1. Apparatus for analyzing complex radiations to separate the wave lengths in the radiations, including a pivotally mounted means to separate the radiations into individual wave lengths, an objective lens to focus the separated wave lengths on a focal curve, a scale located in the focal curve, a stationary device to view said wave lengths and said scale, said scale being integrally connected to and pivotal with said means; said means, scale and objective lens being so located that the ratio of the distance from the scale to the pivot point of said scale over the focal length of the lens is:

$$\frac{(\Delta\alpha+\Delta\beta)}{\Delta\alpha}$$

wherein $\Delta\alpha$ is the change in the angle of incidence to said means in radians, and $\Delta\beta$ is the corresponding change in the angle of diffraction from said means also in radians.

2. Apparatus for separating wave lengths in complex radiations including a plane diffraction grating pivoted about an axis; an objective lens to focus diffracted beams from the grating onto a focal curve, a scale movable in the focal curve, said scale being integrally affixed to the grating by an arm, said arm and scale being pivotable with said grating; the grating, scale and lens being so located that the ratio of the distance from the scale to the pivot point of said scale over the focal length of the lens is:

$$\frac{(\Delta\alpha+\Delta\beta)}{\Delta\alpha}$$

wherein $\Delta\alpha$ is the change in the angle of incidence to said grating in radians, and $\Delta\beta$ is the corresponding change in the angle of diffraction from said grating in radians.

3. An apparatus according to claim 2 wherein the angle between the centermost incident beam striking the grating and the central axis of said lens is less than 45°.

4. An apparatus according to claim 2 wherein an incoming beam of light strikes the grating and is diffracted through the lens; the angle between said incoming beam and the central axis of the lens is 30°; and said ratio is about 2.22 within the visible spectral range 4,000 A.–7,000 A.

5. An apparatus according to claim 2 wherein an incoming beam of light strikes the grating and is diffracted through the lens; the angle between said incoming beam and the central axis of the lens is about 30°; and said ratio is between about 2.17 and 2.33 within the visible spectral range 4,000 A.–7,000 A.

6. A spectroscope wherein an incident beam of light is diffracted and the diffracted monochromatic beam is focused on a focal curve, including a diffraction grating upon which the incident beam of light impinges; said grating being rotatable about an axis located entirely within the plane of the grating and along the center line of the grating; a lens positioned to receive the diffracted beam from the grating and focus the beam at the focal curve of the lens; a scale calibrated in wave length units located in said focal curve; an arm having said scale mounted on one of its ends, the other end of the arm being integrally affixed to and rotatable with the grating; said arm being affixed to the grating at said axis, the angle between the central ray of the incident beam and the central axis of the lens is less than 45°; said spectroscope being so constructed and arranged that:

$$L/f=\frac{(\Delta\alpha+\Delta\beta)}{\Delta\alpha}$$

wherein L is the length of said arm from the axis of the grating to the location of the scale, $f$ is the focal length of said lens, $\Delta\alpha$ is the change in the angle of incidence (in radians) due to rotation of the grating, and $\Delta\beta$ is the corresponding change in the angle of diffraction (in radians) due to the rotation of the grating; such that the scale and spectrum move in synchronism across said focal curve.

7. A spectroscope according to claim 6 wherein the angle between the central ray of the incident beam and the central axis of the lens is about 30° and the ratio $L/f$ is between about 2.17 and 2.33 for the light having wave lengths between 4,000 A. and 7,000 A.

8. A spectroscope according to claim 6 including an eyepiece to view the spectral lines and scale simultaneously.

9. A spectroscope according to claim 6 wherein the ratio $L/f$ is about 2.22.

10. A spectroscope according to claim 6 wherein $\Delta\alpha$ is the angle through which the grating is rotated in bringing various spectral lines into focus on the focal curve.

11. A spectroscope according to claim 6 wherein said grating has less than about 1,226 lines per millimeter.

12. A spectroscope according to claim 6 wherein said grating has less than about 613 lines per millimeter.

13. A spectroscope according to claim 6 wherein the angle between the central ray of the incident beam and the central axis of the lens is less than about 30°, and said grating has less than about 1,226 lines per millimeter.

14. Apparatus for analyzing complex radiations to separate the wave lengths in the radiations by diffracting an incident beam of light; including: a pivotally mounted means to separate the radiations into individual wave lengths, an objective lens to focus the separated wave lengths on a focal curve, a scale located in the focal curve; a stationary device to view said wave lengths and scale; said scale being operatively connected to said pivotally mounted means such that a pivotal movement of said means effects a movement of said scale; said means, scale, objective lens and operative connection between the scale and means being such that $$N\frac{L}{f} = \frac{(\Delta\alpha + \Delta\beta)}{\Delta\alpha}$$

wherein:

$N$ is the mechanical advantage of the operative connection between said pivotally mounted means and said scale;

$L$ is the length of a lever arm which engages and moves the scale; the lever arm being moved through an angle $N\Delta\alpha$ upon rotation of the pivotally mounted means through an angle $\Delta\alpha$;

$f$ is the focal length of said lens;

$\Delta\alpha$ is the angle through which the pivotally mounted means is rotated; and $\Delta\beta$ is the change in the angle of diffraction of said wave lengths due to rotation of said pivotally mounted means through angle $\Delta\alpha$.

15. An apparatus according to claim 2 wherein an incoming beam of light strikes the grating and is diffracted through the lens; the angle between said incoming beam and the central axis of the lens being between about 30°–45°; said grating having between about 613–1226 lines per millimeter, and said ratio being between about 2.09–2.65 in the visible spectral range 4,000 A.–7,000 A.

16. An apparatus according to claim 15 wherein said ratio is between about 2.13–2.34.

17. An apparatus according to claim 2 wherein an incoming beam of light strikes the grating and is diffracted through the lens; the angle between said beam and the central axis of the lens being about 30°, said grating having about 1226 lines per millimeter; and said ratio being between about 2.17–2.33 in the visible spectral range 4,000 A.–7,000 A.

18. An apparatus according to claim 2 wherein an incoming beam strikes the grating and is diffracted through the lens; the angle between the beam and the central axis of the lens being about 30°; said grating having about 613 lines per millimeter; and said ratio being between about 2.09–2.17 in the visible spectral range 4,000 A.–7,000 A.

19. An apparatus according to claim 2 wherein an incoming beam of light strikes the grating and is diffracted through the lens; the angle between said beam and the central axis of the lens being about 45°, said grating having about 1226 lines per millimeter; and said ratio being about 2.20–2.65 in the visible spectral range 4,000 A.–7,000 A.

20. An apparatus according to claim 2 wherein an incoming beam strikes the grating and is diffracted through the lens; the angle between the beam and the central axis of the lens being about 45°; said grating having about 613 lines per millimeter; and said ratio being between about 2.09–2.19 in the visible spectral range 4,000 A.–7,000 A.

References Cited in the file of this patent

UNITED STATES PATENTS

| | | |
|---|---|---|
| 2,039,355 | Tschermak-Seysenegg | May 5, 1936 |
| 2,431,734 | Cutting | Dec. 2, 1947 |

UNITED STATES PATENT OFFICE
CERTIFICATE OF CORRECTION

Patent No. 3,024,693                  March 13, 1962

Duane D. Harmon

It is hereby certified that error appears in the above numbered patent requiring correction and that the said Letters Patent should read as corrected below.

Column 3, line 51, for "gating" read -- grating --; column 4, line 32, for "smal" read -- small --; line 33, after "concluded" insert -- that --; line 43, for "This" read -- Thus --; column 5, lines 15 and 16, for "sepectroscope read -- spectroscope --; line 19, for "with" read -- when --.

Signed and sealed this 10th day of July 1962.

(SEAL)
Attest:

ERNEST W. SWIDER
Attesting Officer

DAVID L. LADD
Commissioner of Patents